Patented Apr. 27, 1943

2,317,736

UNITED STATES PATENT OFFICE 2,317,736

REACTION PRODUCT OF ALDEHYDES AND PYRIMIDYL CYANOALKYL SULPHIDES

Gaetano F. D'Alelio and James W. Underwood, Pittsfield, Mass., assignors to General Electric Company, a corporation of New York No Drawing. Application May 27, 1941, Serial No. 395,424

18 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a pyrimidyl cyanoalkyl sulphide corresponding to the following general formula:

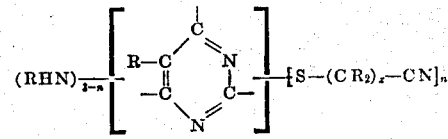

In the above formula $n$ represents an integer and is at least 1 and not more than 3, $x$ is an integer and is at least 1 and not more than 2, and R represents a member of the class consisting of hydrogen and monovalent hydrocarbon and halohydrocarbon radicals, numerous examples of which hereafter are given. Since $x$ represents an integer which is 1 or 2, it will be seen that the linkage of the cyanoalkyl group to the sulphur atom in all cases will be alpha or beta to the cyano group. It also will be observed that linkage of the pyrimidyl grouping to the sulphur atom is through a carbon atom. From a consideration of the formula it further will be seen that when $n$ is 3 there will be no amino groups attached to the pyrimidyl nucleus.

Illustrative examples of monovalent hydrocarbon radicals which R in the above formula may be are aliphatic (e. g., methyl, ethyl, propyl, isopropyl, butyl, secondary butyl, isobutyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl, naphthyl, etc.); alkaryl (e. g., tolyl, xylyl, ethylphenyl, propylphenyl, isopropylphenyl, etc.); aralkyl (e. g., benzyl, phenylethyl, phenylpropyl, etc.); and their homologues, as well as those groups with one or more of their hydrogen atoms substituted by, for example, a halogen. Specific examples of halogeno-substituted hydrocarbon radicals are chlormethyl, chlorcyclohexyl, chlorphenyl, dichlorphenyl, ethyl chlorphenyl, phenyl chlorethyl, bromethyl, bromtolyl, etc. Preferably R is hydrogen.

More specific examples of pyrimidyl cyanoalkyl sulphides that may be employed in producing our new condensation products are pyrimidyl tri-(cyanomethyl sulphide), pyrimidyl tri-(cyanoethyl sulphide), the monoamino pyrimidyl di-(cyanomethyl sulphides), the monoamino pyrimidyl di-(cyanoethyl sulphides), the diamino pyrimidyl mono-(cyanomethyl sulphides) and the diamino pyrimidyl mono-(cyanoethyl sulphides). Other and more specific examples of pyrimidyl cyanoalkyl sulphides that may be used in producing our new condensation products are listed below:

4,6-di-(methylamino) 5-phenyl pyrimidyl-2 beta-(alpha-phenyl cyanobutyl) sulphide 4,6-dianilino pyrimidyl-2 beta-(gamma-cyclohexyl cyanopropyl) sulphide 2,6-diamino 5-methyl pyrimidyl-4 alpha-(cyanoethyl) sulphide [2,4-diamino 5-methyl pyrimidyl-6 alpha-(cyanoethyl) sulphide]

6-toluido 5-ethyl pyrimidyl-2,4 di-(beta-cyanopropyl sulphide)

2-methylamino 5-phenyl pyrimidyl-4,6 di-[beta-(alpha-chlorphenyl cyanoethyl) sulphide]

Pyrimidyl-2,4,6 tri-(cyanomethyl sulphide)

6-amino pyrimidyl-2,4 di-(cyanomethyl sulphide [4-amino pyrimidyl-2,6 di-(cyanomethyl sulphide)]

5-phenyl pyrimidyl-2,4,6 tri-[beta-(alpha-phenyl cyanopropyl) sulphide]

6-amino pyrimidyl 2-cyanomethyl 4-(beta-cyanoethyl) disulphide 4-anilino 6-methylamino pyrimidyl-2 cyanomethyl sulphide 4,6-diamino pyrimidyl-2 beta-cyanoethyl sulphide 4,6-diamino pyrimidyl-2 alpha-cyanoethyl sulphide The pyrimidyl cyanoalkyl sulphides that are used in carrying the present invention into effect are more fully described and are specifically claimed in our copending application Serial No. 395,425, filed concurrently herewith, now Patent No. 2,295,559, issued September 15, 1942, and assigned to the same assignee as the present invention. The formulas for the above compounds are shown in this copending application.

The present invention is based on our discovery that new and valuable materials of particular utility in the plastics and coating arts can be produced by effecting reaction between ingredients comprising essentially an aldehyde, including polymeric aldehydes and aldehyde-addition products, and certain pyrimidyl cyanoalkyl sulphides, more particularly cyanomethyl and cyanoethyl sulphides, numerous examples of which have been given above and in our above-identified copending application.

Resins heretofore have been made by condensing an aldehyde with certain pyrimidine thioethers, but such known resins are not entirely satisfactory from the standpoint of optimum heat-, water- and abrasion-resistance and in curing characteristics. One possible explanation for these deficiencies in desirable properties is the fact that the starting material contains thio groups that are aldehyde-non-reactable. In marked contrast the starting organic sulphides used in practicing this invention contain aldehyde-reactable thio groups attached to the pyrimidyl nucleus, thereby imparting to the condensation products of such sulphides with aldehydes increased heat-, water- and abrasion-resistance and improved curing characteristics as compared with known resinous condensation products of an aldehyde and a pyrimidine thioether.

In practicing our invention the initial condensation reaction may be carried out at normal or at elevated temperatures, at atmospheric, sub-atmospheric or super-atmospheric pressures and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. Good results are obtained by causing the condensation reaction between the primary components to take place in the presence of a primary condensation catalyst and a secondary condensation catalyst. Condensation products of excellent time- or storage-stability characteristics are obtained by using as the primary catalyst a member of the class consisting of (1) nitrogen-containing basic tertiary compounds that are aldehyde-non-reactable, e. g., tertiary amines such as trialkyl (e. g., trimethyl, triethyl, etc.) amines, triaryl (e. g., triphenyl, tricresyl, etc.) amines, etc., and (2) nitrogen-containing basic compounds that are aldehyde-reactable, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of primary catalyst, should be a fixed alkali, for instance, a carbonate, cyanide or hydroxide of an alkali metal (e. g., sodium, potassium, lithium, etc.).

Illustrative examples of acid condensation catalysts that may be employed are inorganic or organic acids such as hydrochloric, sulphuric, phosphoric, acetic, lactic, acrylic, malonic, etc., or acid salts such as sodium acid sulphate, monosodium phosphate, monosodium phthalate, etc. Mixtures of acids, of acid salts or of acids and of acid salts may be employed if desired.

The reaction between the pyrimidyl cyanoalkyl sulphide and the aldehyde, e. g., formaldehyde, may be carried out in the presence of solvents or diluents, fillers, other natural or synthetic resinous bodies, or while admixed with other materials which also can react with the aldehydic reactant or with the pyrimidyl cyanoalkyl sulphide, e. g., ketones, urea, thiourea, selenourea, iminourea (guanidine), substituted ureas, thioureas, selenoureas and iminoureas, numerous examples of which are given in various co-pending applications of one of us (Gaetano F. D'Alelio), for instance, in D'Alelio copending application Serial No. 363,037 filed October 26, 1940; monoamides of monocarboxylic and polycarboxylic acids and polyamides of polycarboxylic acids, e. g., acetamide, halogenated acetamides, e. g., a chlorinated acetamide, maleic monoamide, malonic monoamide, phthalic monoamide, maleic diamide, fumaric diamide, malonic diamide, itaconic diamide, succinic diamide, phthalic diamide, the monoamide, diamide and triamide of citric acid, the monoamide, diamide and triamide of tricarballylic acid, etc.; 5-membered aminotriazines, which compounds also may be named aminotriazoles (amidogentriazoles), and aminotriazines (amidogentriazines), e. g., melamine, ammeline, ammelide, numerous other examples being given in various D'Alelio copending applications, for instance, in D'Alelio copending application Serial No. 377,524, filed Feb. 5, 1941, and in applications referred to in said copending application; aminodiazines and aminodiazoles; phenol and substituted phenols, e. g., the cresols, the xylenols, the tertiary alkyl phenols and other phenols such as mentioned in D'Alelio Patent No. 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like. These modifying reactants may be incorporated with the pyrimidyl cyanoalkyl sulphide and the aldehyde by mixing all the reactants and effecting condensation therebetween or by various permutations of the reactants as described, for example, in D'Alelio copending application Serial No. 363,037 with particular reference to reactions involving a urea, an aldehyde and a semi-amide of oxalic acid. For instance, we may form a partial condensation product of ingredients comprising urea, a diamino pyrimidyl cyanomethyl sulphide and formaldehyde and thereafter effect reaction between this partial condensation product and a chlorinated acetamide to obtain a heat-curable composition.

Some of the condensation products of this invention are thermoelastic materials while others are thermosetting or potentially thermosetting bodies which convert under heat or under heat and pressure to an insoluble, infusible state. The thermoplastic condensation products are of particular utility as plasticizers for other synthetic resins. The thermosetting or potentially thermosetting condensation products, alone or mixed with fillers, pigments, dyes, lubricants, plasticizers, etc., may be used, for example, in the production of molding compositions.

Depending upon the particular reactants employed and the particular conditions of reaction, the intermediate or partial condensation products vary from clear, colorless or colored, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance, as surface-coating materials, in the production of paints, varnishes, lacquers, enamels, etc., for general adhesive applications, in producing laminated articles and for numerous other purposes. The liquid, heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

Example 1

| | Parts |
|---|---|
| 4,6-diamino pyrimidyl-2 cyanomethyl sulphide | 54.3 |
| Aqueous formaldehyde (approx. 37.1% HCHO) | 145.6 |
| Sodium hydroxide in 10 parts water | 0.2 | were heated together under reflux at the boiling temperature of the mass for 30 minutes. When the resulting syrup was heated at 140° C. a thermoplastic resinous composition was obtained. A thermosetting resinous composition is produced by adding, either to the syrup or to the thermoplastic resin, direct or active curing catalysts (e. g., phthalic anhydride, citric acid, etc.), or latent curing catalysts (e. g., sodium chloracetate, diethyl chloracetamide, ethyl glycine ester hydrochloride, etc.) or by intercondensation with curing reactants (e. g., mono-, di- and tri-chloracetamides, chloracetonitrile, alpha, beta-dibrompropionitrile, aminoacetamide hydrochloride, aminoacetonitrile hydrochloride, ethylene diamine monohydrochloride, diethanol amine hydrochloride, nitrourea, glycine, sulphamic acid, chloracetyl urea, chloracetone, citric diamide, phenacyl chloride, etc.). Other examples of active and latent curing catalysts and of curing reactants that may be employed to accelerate or to effect the curing of the thermosetting or potentially thermosetting resins of this and other examples are given in various D'Alelio copending applications, for instance, in copending application Serial No. 346,962, filed July 23, 1940, and Serial No. 354,395, filed August 27, 1940, both of which applications are assigned to the same assignee as the present invention.

One hundred and fifteen (115) parts of the syrupy condensation product were mixed with 0.3 part sulphamic acid and the mixture was heated under reflux to cause the sulphamic acid to intercondense with the partial condensation product of the formaldehyde and the pyrimidyl cyanomethyl sulphide. The resulting condensation product was mixed with 35 parts alpha cellulose in flock form and 0.2 part of a mold lubricant, specifically zinc stearate, to form a molding compound. The wet compound was dried for 2½ hours at 75° C. A sample of the dried compound was molded for 5 minutes at 130° C. under a pressure of 2,000 pounds per square inch. A well-cured molded article having a good gloss was obtained.

Example 2

| | Parts |
|---|---|
| 4,6-diamino pyrimidyl-2 cyanomethyl sulphide | 27.2 |
| Urea | 81.0 |
| Aqueous formaldehyde (approx. 37.1% HCHO) | 243.0 |
| Sodium hydroxide in 5 parts water | 0.1 | were heated together under reflux for 30 minutes, yielding a thick syrup. When heated at 140° C. this syrup bodied to a thermoplastic resin. Insoluble, infusible resins were obtained when small samples of this syrup were treated with active or latent curing catalysts or intercondensed with curing reactants, as described under Example 1, followed by heating on a 140° C. hot plate.

Two hundred and thirty (230) parts of the syrupy condensation product were mixed with 0.5 part sulphamic acid, followed by heating for one minute to effect intercondensation between the components. The resulting liquid condensation product was mixed with 70 parts alpha cellulose in flock form and 0.4 part zinc stearate to form a molding compound. The wet compound was dried for 1¾ hours at 75° C. A molded piece was made from a sample of the dried compound by molding it for 5 minutes at 130° C. under a pressure of 2,000 pounds per square inch. The molded piece was very well-cured throughout and gave evidence of good plastic flow during molding.

From this example it will be noted that the pyrimidyl cyanoalkyl sulphides used in carrying this invention into effect are compatible with urea and that the organic sulphide and urea cocondensed with the aldehyde, specifically formaldehyde, to yield new and useful resinous compositions.

Example 3

| | Parts |
|---|---|
| 4,6-diamino pyrimidyl-2 cyanomethyl sulphide | 9.0 |
| Phenol, synthetic | 90.0 |
| Aqueous formaldehyde (approx. 37.1% HCHO) | 195.0 |
| Potassium carbonate in 10 parts water | 2.85 |

A liquid partial condensation product of phenol and formaldehyde was prepared by heating together the above-stated proportions of phenol and aqueous formaldehyde for 3½ hours at 65°–70° C. in the presence of the stated amount of potassium carbonate. The organic sulphide was added and the resulting mixture heated under reflux at the boiling temperature of the mass for one hour. Five (5) parts oxalic acid in 20 parts water were added to the resulting product to acidify the mass. The acidified syrup was mixed with 57 parts alpha cellulose in flock form and 0.6 part zinc stearate to form a molding compound. The wet compound was dried for one hour at 75° C. A sample of the dried compound was molded for 5 minutes at 130° C. under a pressure of 2,000 pounds per square inch. A well-cured molded article was obtained. The compound showed good plastic flow during molding. The molded piece had excellent resistance to water.

Example 4

| | Parts |
|---|---|
| 4,6-diamino pyrimidyl-2 cyanomethyl sulphide | 18.1 |
| Furfural | 38.4 |
| Sodium hydroxide in 5 parts water | 0.1 |
| Water | 100.0 | were heating together for 15 minutes, under reflux, at the boiling temperature of the mass. The resulting product was a viscous resin. When this resin was dehydrated by heating at 140° C. a thermoelastic material was produced. Treatment of the viscous resin with active or latent curing catalysts or intercondensation of the viscous resin with curing reactants, as described under Example 1, yielded a resinous mass which cured to an insoluble, infusible state when heated on a 140° C. hot plate. During curing the resin formed a tough, adherent film.

Example 5

| | Parts |
|---|---|
| 4,6-diamino pyrimidyl-2 cyanomethyl sulphide | 18.1 |
| Acrolein | 22.4 |
| Sodium hydroxide in 5 parts water | 0.1 | were heated together under reflux for 15 minutes. A light-colored resin precipitated from the mass. This resin cured slowly to an insoluble, infusible state when heated at 140° C. An accelerated cure of the resin was obtained by treating it with active or latent curing catalysts or by intercondensation with curing reactants as described under Example 1.

Example 6

| | Parts |
|---|---|
| 4,6-diamino pyrimidyl-2 cyanomethyl sulphide | 18.1 |
| N-Butyl alcohol | 74.0 |
| Aqueous formaldehyde (approx. 37.1% HCHO) | 64.8 |
| Sodium hydroxide in 5 parts water | 0.1 | were heated together under reflux for 15 minutes to yield a clear, resinous syrup. This syrup bodied to a thermoelastic resinous mass when heated at 140° C. A thermosetting resinous composition was produced by adding active or latent curing catalysts or by intercondensation with curing reactants as described under Example 1.

The product of this example is especially suitable for use as a modifier of varnishes of the aminoplast and alkyd-resin types.

Example 7

| | Parts |
|---|---|
| 4,6-diamino pyrimidyl-2 cyanomethyl sulphide | 18.1 |
| Ethyl malonate | 16.0 |
| Aqueous formaldehyde (approx. 37.1% HCHO) | 40.5 |
| Sodium hydroxide in 5 parts water | 0.1 | were heated together under reflux for 15 minutes, yielding a resin capable of curing to an insoluble, infusible state without the addition of active or latent curing catalysts or of curing reactants. However, the addition of such agents accelerated the cure of the resin. The cured resin was hard, tough and exceptionally resistant to water, alcohols, esters, ethers and the like.

Example 8

| | Parts |
|---|---|
| 4,6-diamino pyrimidyl-2 cyanomethyl sulphide | 18.1 |
| Acetamide | 5.9 |
| Aqueous formaldehyde (approx. 37.1% HCHO) | 32.4 |
| Sodium hydroxide in 5 parts water | 0.1 | were heated together under reflux for 30 minutes to yield a clear, viscous syrup. A water-soluble, thermoplastic resin was obtained by dehydrating the syrupy condensation product at 110°–120° C. When heated at 140° C. the syrup bodied to a thermoelastic resin. A thermosetting resin is produced by adding active or latent curing catalysts or by intercondensation with curing reactants as described under Example 1.

The excellent flow characteristics of the resinous composition of this example make it particularly suitable for use as a plasticizer of urea-formaldehyde resins and other aminoplasts.

Example 9

| | Parts |
|---|---|
| 4,6-diamino pyrimidyl-2 cyanomethyl sulphide | 18.1 |
| Glycerine | 9.2 |
| Aqueous formaldehyde (approx. 37.1% HCHO) | 64.8 |
| Sodium hydroxide in 5 parts water | 0.1 | were heated together under reflux for 30 minutes. The resulting syrupy condensation product was converted to a thermoplastic resin by heating it at 140° C. A thermosetting resin is produced by adding active or latent curing catalysts or by intercondensation with curing reactants as described under Example 1.

The resinous composition of this example has curing qualities which are much the same as the product of Example 8. It has good flow characteristics and hence is suitable for use as a plasticizer in much the same way as described above with reference to the product of Example 8.

Example 10

| | Parts |
|---|---|
| 4,6-diamino pyrimidyl-2 cyanomethyl sulphide | 18.1 |
| Polyvinyl alcohol | 26.4 |
| Aqueous formaldehyde (approx. 37.1% HCHO) | 64.8 |
| Sodium hydroxide in 5 parts water | 0.1 |
| Water | 100.0 | were heated together for 30 minutes under reflux, yielding a very viscous syrup. When this syrup was dehydrated by heating it at 140° C. a rather tough, thermoelastic resin was obtained. A thermosetting resin is produced by adding active or latent curing catalysts or by intercondensation with curing reactants as described under Example 1. With acids such as hydrochloric acid a thermosetting resin that was tough, hard and of good water resistance was produced. This resin is well-suited for the production of strong, transparent films.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes which may be used are acetaldehyde, propionaldehyde, butyraldehyde, methacrolein, crotonaldehyde, benzaldehyde, furfural, etc., mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives, of urea, thiourea, selenourea and iminourea, and of substituted ureas, thioureas, selenoureas and iminoureas (numerous examples of which are given in D'Alelio copending application Serial No. 377,524), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of amidogentriazines, numerous examples of which are given in D'Alelio copending application Serial No. 377,524. Particularly good results are obtained with active methylene-containing bodies such as mono- and di-methylol ureas and the methylol melamines, e. g., mono-, di-, tri-, tetra-, penta- and hexa-methylol melamines. Mixtures of aldehydes and active methylene-containing bodies may be employed, e. g., mixtures of formaldehyde and methylol compounds such, for instance, as dimethylol urea and trimethylol melamine.

The ratio of the aldehydic reactant to the pyrimidyl cyanoalkyl sulphide may be varied over a wide range, but ordinarily these reactants are employed in an amount corresponding to at least one mol of the aldehyde, specifically formaldehyde, for each mol of the pyrimidyl cyanoalkyl sulphide. Thus we may use, for example, from one to five or six mols of an aldehyde for each mol of the pyrimidyl cyanoalkyl sulphide. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example, up to 10 or 12 mols of such alkyl derivatives for each mol of the pyrimidyl cyanoalkyl sulphide.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for instance, monohydric alcohols such as ethyl, propyl, isopropyl, butyl, amyl, etc., alcohols; polyhydric alcohols such as ethylene glycol, diethylene glycol, glycerine, pentaerythritol, etc.; amides such as formamide, stearamide, acrylamide, benzamide, toluene sulphonamides, benzene disulphonamides, benzene trisulphonamides, adipic diamide, phthalamide, etc.; amines such as ethylene diamine, aniline, phenylene diamine, etc.; phenol and substituted phenols, including aminophenols, etc.; ketones, including halogenated ketones; nitriles, e. g., acrylonitrile, methacrylonitrile, succinonitrile, including halogenated nitriles, etc.; and others.

The modifying bodies also may take the form of high molecular weight bodies with or without resinous characteristics, for example, hydrolyzed wood products, formalized cellulose derivatives, lignin, protein-aldehyde condensation products, resinous reaction products of aldehydes, for example formaldehyde, with the aminotriazoles (e. g., guanazole, phenyl guanazole, etc.), alone or admixed with, for example, urea, melamine, or urea and melamine, resins obtained by reaction of an aldehyde with other aminodiazines (e. g., 2,4,6-triaminopyrimidine, 2,4-diaminoquinazoline, etc.), the aminotriazines or the aminodiazoles, alone or admixed with, for example, urea, melamine or urea and melamine. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers including polyvinyl acetals, specifically polyvinyl formal, etc.

Instead of effecting reaction between a pyrimidyl cyanoalkyl sulphide and an aldehyde, e. g., formaldehyde, we may cause an aldehyde to condense with a salt of certain pyrimidyl cyanoalkyl sulphides or with a mixture of a pyrimidyl cyanoalkyl sulphide and a salt (organic or inorganic) thereof. As examples of salts of pyrimidyl cyanoalkyl sulphides we mention salts of mono- and di-amino pyrimidyl cyanoalkyl sulphides and organic or inorganic acids as, for instance, hydrochloric, hydrobromic, hydroiodic, sulphuric, phosphoric, boric, selenic, chromic, acetic, chloracetic, propionic, butyric, valeric, caproic, acrylic, polyacrylic, methacrylic, polymethacrylic, oxalic, malonic, succinic, adipic, malic, maleic, fumaric, benzoic, salicyclic, camphoric, phthalic, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The thermosetting molding compositions of this invention are usually molded at temperatures of the order of 100° to 200° C. and at pressures of the order of 1,000 to 5,000 pounds or more per square inch.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the reaction product of ingredients comprising an aldehyde and a pyrimidyl cyanoalkyl sulphide corresponding to the general formula

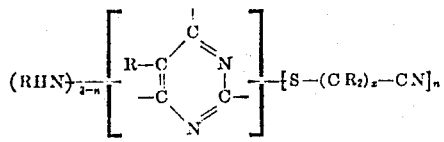

where $n$ is an integer and is at least 1 and not more than 3, $x$ is an integer and is at least 1 and not more than 2, and R is a member of the class consisting of hydrogen and monovalent hydrocarbon and halo-hydrocarbon radicals.

2. A composition as in claim 1 wherein the aldehyde is formaldehyde.

3. A composition comprising a condensation product of ingredients comprising an aldehyde and a pyrimidyl cyanoalkyl sulphide corresponding to the general formula

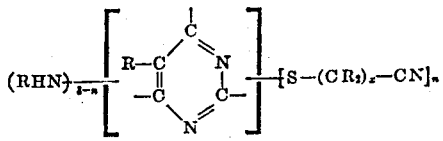

where $n$ is an integer and is at least 1 and not more than 3, $x$ is an integer and is at least 1 and not more than 2, and R represents hydrogen.

4. A composition comprising a condensation product of ingredients comprising formaldehyde and a pyrimidyl cyanoalkyl sulphide corresponding to the general formula

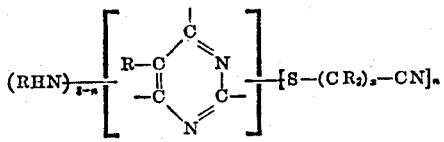

where $n$ is an integer and is at least 1 and not more than 3, R represents hydrogen and $x$ is 1.

5. A resinous composition comprising the product of reaction of ingredients comprising pyrimidyl-2,4,6 tri-(cyanomethyl sulphide) and an aldehyde.

6. A resinous composition comprising the product of reaction of ingredients comprising a monoamino pyrimidyl di-(cyanomethyl sulphide) and an aldehyde.

7. A resinous composition comprising the product of reaction of ingredients comprising a diamino pyrimidyl cyanomethyl sulphide and an aldehyde.

8. A resinous composition comprising the product of reaction of ingredients comprising formaldehyde and 4,6-diamino pyrimidyl-2 cyanomethyl sulphide.

9. A heat-curable resinous condensation product of ingredients comprising formaldehyde and a pyrimidyl cyanoalkyl sulphide corresponding to the general formula

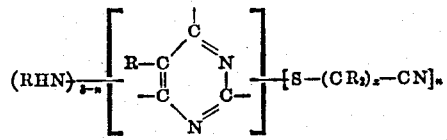

where $n$ is an integer and is at least 1 and not more than 3, R represents hydrogen and $x$ is 1.

10. A product comprising the heat-cured resinous condensation product of claim 9.

11. A composition as in claim 1 wherein the reaction product is an alkaline-catalyzed reaction product of the stated components.

12. A composition as in claim 1 wherein the reaction product is an alcohol-modified reaction product of the stated components.

13. A composition comprising the product of reaction of ingredients comprising urea, a diamino pyrimidyl cyanomethyl sulphide and an aldehyde.

14. A composition comprising the product of reaction of ingredients comprising melamine, a diamino pyrimidyl cyanomethyl sulphide and formaldehyde.

15. A composition comprising the product of reaction of ingredients comprising a phenol, an aldehyde and a pyrimidyl cyanoalkyl sulphide corresponding to the general formula

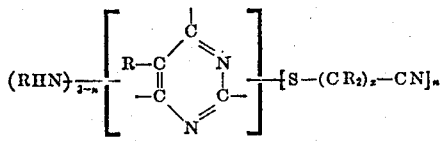

where $n$ is an integer and is at least 1 and not more than 3, $x$ is an integer and is at least 1 and not more than 2, and R is a member of the class consisting of hydrogen and monovalent hydrocarbon and halo-hydrocarbon radicals.

16. A heat-curable composition comprising the heat-convertible product of reaction of (1) a partial condensation product of ingredients comprising urea, a diamino pyrimidyl cyanomethyl sulphide and formaldehyde and (2) a chlorinated acetamide.

17. A product comprising the heat-cured composition of claim 16.

18. The method of preparing new condensation products which comprises effecting reaction between ingredients comprising an aldehyde and a pyrimidyl cyanoalkyl sulphide corresponding to the general formula

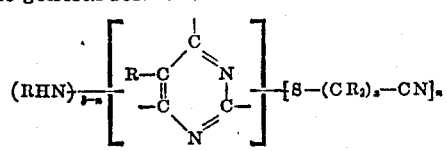

where $n$ is an integer and is at least 1 and not more than 3, $x$ is an integer and is at least 1 and not more than 2, and R is a member of the class consisting of hydrogen and monovalent hydrocarbon and halo-hydrocarbon radicals.

GAETANO F. D'ALELIO.
JAMES W. UNDERWOOD.

CERTIFICATE OF CORRECTION.

Patent No. 2,317,736. April 27, 1943.

GAETANO F. D'ALELIO, ET AL.

It is hereby certified that error appears in the printed specification of the above numbered patent requiring correction as follows: Page 1, second column, line 21, after the word "sulphide" insert a closing parenthesis; page 3, second column, line 63, for "heating" read --heated--; page 5, first column, line 25, for "alkyl" read --alkylol--; and that the said Letters Patent should be read with this correction therein that the same may conform to the record of the case in the Patent Office.

Signed and sealed this 1st day of June, A. D. 1943.

(Seal)

Henry Van Arsdale,
Acting Commissioner of Patents.